(12) United States Patent
Schwamberger et al.

(10) Patent No.: US 12,266,970 B2
(45) Date of Patent: Apr. 1, 2025

(54) ELECTRICAL CONTACTING OF STATOR CONNECTIONS ON PCB BY CRIMP CONNECTION

(71) Applicant: NIDEC GPM GmbH, Auengrund OT Merbelsrod (DE)

(72) Inventors: Frank Schwamberger, Schleusingen (DE); Jakob Schnitzer, Hilburghausen (DE); Conrad Nickel, Troistedt (DE)

(73) Assignee: NIDEC GPM GMBH, Merbelsrod (DE)

( * ) Notice: Subject to any disclaimer, the term of this patent is extended or adjusted under 35 U.S.C. 154(b) by 736 days.

(21) Appl. No.: 17/402,958

(22) Filed: Aug. 16, 2021

(65) Prior Publication Data

US 2021/0376669 A1   Dec. 2, 2021

Related U.S. Application Data

(63) Continuation-in-part of application No. PCT/EP2020/054896, filed on Feb. 25, 2020.

(30) Foreign Application Priority Data

Feb. 25, 2019  (DE) .......................... 102019104705.6

(51) Int. Cl.
| | | |
|---|---|---|
| H02K 1/12 | (2006.01) | |
| F04D 13/06 | (2006.01) | |
| H02K 3/04 | (2006.01) | |
| H02K 7/14 | (2006.01) | |
| H02K 15/06 | (2025.01) | |

(52) U.S. Cl.
CPC .......... *H02K 1/12* (2013.01); *F04D 13/0693* (2013.01); *H02K 3/04* (2013.01); *H02K 7/14* (2013.01); *H02K 15/06* (2013.01); *H02K 2203/03* (2013.01)

(58) Field of Classification Search
CPC .. H02K 1/12; H02K 3/52; H02K 3/04; H02K 15/06; H02K 3/50; H02K 7/14; H02K 2211/03; H02K 2203/03; F04D 13/0693
USPC ........................................................ 310/195
See application file for complete search history.

(56) References Cited

U.S. PATENT DOCUMENTS

| | | | |
|---|---|---|---|
| 6,177,741 B1* | 1/2001 | Lutkenhaus | F04D 13/064 |
| | | | 310/91 |
| 7,692,341 B2* | 4/2010 | Lafontaine | H02K 21/22 |
| | | | 310/58 |
| 9,590,323 B2* | 3/2017 | Winheim | H01R 4/2425 |

(Continued)

FOREIGN PATENT DOCUMENTS

| | | |
|---|---|---|
| DE | 197 40 938 A1 | 3/1999 |
| WO | 2016/128756 A1 | 8/2016 |

OTHER PUBLICATIONS

Translation of foreign document DE 19740938 A1 (Year: 1999).*

(Continued)

*Primary Examiner* — Alex W Mok
(74) *Attorney, Agent, or Firm* — Keating & Bennett, LLP

(57) ABSTRACT

A pump includes an electric motor with a rotor rotatably supported about an axis of rotation and circumferentially surrounding a stator. The stator includes a stator core and coils wound on the stator core. The windings are defined by a winding wire including winding wire end sections that are electrically contacted with a printed circuit board by a crimp connection.

12 Claims, 4 Drawing Sheets

(56) References Cited

U.S. PATENT DOCUMENTS

| | | | |
|---|---|---|---|
| 2002/0096594 A1* | 7/2002 | Meier | H02K 15/095 |
| | | | 242/439.1 |
| 2010/0181851 A1* | 7/2010 | Shinkawa | H02K 3/28 |
| | | | 310/198 |
| 2013/0200742 A1* | 8/2013 | Seki | H02K 15/095 |
| | | | 310/195 |
| 2014/0191598 A1 | 7/2014 | Winheim et al. | |
| 2015/0188377 A1* | 7/2015 | Kim | H02K 29/03 |
| | | | 417/415 |
| 2017/0302130 A1 | 10/2017 | Yamada et al. | |
| 2020/0106319 A1 | 4/2020 | Tategata et al. | |

OTHER PUBLICATIONS

Official Communication issued in International Patent Application No. PCT/EP2020/054896, mailed on Jun. 8, 2020.
Official Communication issued in International Patent Application No. PCT/EP2020/054896, issued on Aug. 25, 2021.
English translation of Official Communication issued in International Patent Application No. PCT/EP2020/054896, mailed on Jun. 8, 2020.

* cited by examiner

ELECTRICAL CONTACTING OF STATOR CONNECTIONS ON PCB BY CRIMP CONNECTION

CROSS REFERENCE TO RELATED APPLICATIONS

This is a Continuation-in-Part of PCT Application No. PCT/EP2020/054896, filed on Feb. 25, 2020, and with priority under 35 U.S.C. § 119(a) and 35 U.S.C. § 365(b) being claimed from German Application No. 102019104705.6, filed Feb. 25, 2019; the entire disclosures of which are hereby incorporated herein by reference.

1. FIELD OF THE INVENTION

The present disclosure relates to a pump, an electric motor, and a method of electrically contacting a stator to a printed circuit board.

2. BACKGROUND

Pumps often feature DC motors. The DC motors include a rotor connected to a motor shaft and rotatably mounted in a housing. The rotor is provided with permanent magnets. A stator is arranged in the rotor, which carries a number of windings on an iron core. When suitably controlled, the windings generate a magnetic field that drives the rotor to rotate. The windings are usually wound in three phases and are accordingly provided with three electrical connections through which the windings can be connected to a control unit (ECU). At low power levels, busbars in the form of conductor foils can be used. For higher powers, the winding connection wires are contacted via busbars made of copper sheet. It is also known to connect the winding connection wires directly to the printed circuit board by insulation displacement contacts.

A cooling fan motor is known from DE 10 2011 112 821 A1, the stator windings of which are electrically contacted on a printed circuit board by insulation displacement contacts. The insulation displacement contacts are U-shaped. They run parallel to the direction of rotation, which is why the end of the coil is inserted into the insulation displacement contact in the axial direction during assembly. During press-fitting, the area of the insulation displacement contacts must be accessible to the press-fitting tool, which has proved difficult in some cases.

SUMMARY

Example embodiments of the present disclosure provide cost-effective, simple, and space-saving solutions for connections between stators and printed circuit boards.

An example embodiment of the present disclosure includes a pump with an electric motor with a rotor which is mounted rotatably about an axis of rotation and which circumferentially surrounds a stator. The stator includes a stator core and coils wound on the stator core. The windings are made from a winding wire with winding wire end sections electrically contacted with a printed circuit board by a crimp connection. This connection is particularly easy to make. For the connection, splice elements (also called open crimp sleeves) are on the printed circuit board, each of which includes an opening permitting insertion of two winding wire end sections of one phase, the opening extending parallel or substantially parallel to the surface of the printed circuit board.

Preferably, the splice elements are U-shaped.

It is preferred if the winding wire end sections are inserted into the respective splice elements parallel or substantially parallel to the surface of the printed circuit board.

Preferably, the stator and the printed circuit board are oriented with their upper and lower sides parallel or substantially parallel to each other.

It is advantageous if the winding wire end sections extend exclusively in the radial direction and in the direction of the axis of rotation.

An example embodiment of a method of electrically contacting a stator of an electric motor of a pump with a printed circuit board, the stator including a stator core and coils wound on the stator core, and the windings being defined by a winding wire having winding wire end sections and the winding wire end sections extend parallel or substantially parallel to the longitudinal axis of the pump, includes the steps of bending the winding wire end sections outward in the radial direction to the longitudinal axis, stripping the ends of the winding wire end sections, placing the stator with respect to the printed circuit board, with the printed circuit board and the stator including their upper and lower sides oriented parallel or substantially parallel to each other, inserting the ends of the winding wire end sections parallel or substantially parallel to the surface of the printed circuit board into splice elements arranged on the printed circuit board, and compressing the splice elements to electrically contact the winding wire end sections with the printed circuit board.

In addition, an electric motor is provided with a rotor which is mounted rotatably about an axis of rotation and which circumferentially surrounds a stator, the stator including a stator core and coils wound on the stator core, and the windings being defined by a winding wire with winding wire end sections, and the winding wire end sections being electrically contacted with a printed circuit board by a crimp connection. For the connection, splice elements are arranged on the printed circuit board, each of which has an opening for insertion of two winding wire end sections of one phase, the opening facing parallel or substantially parallel to the surface of the printed circuit board.

It is advantageous if the splice elements are U-shaped.

The winding wire end sections are preferably inserted into the respective splice element parallel or substantially parallel to the surface of the printed circuit board.

Preferably, the stator and the printed circuit board are oriented with their upper and lower sides parallel or substantially parallel to each other.

It is advantageous if the winding wire end sections extend exclusively in the radial direction and in the direction of the axis of rotation.

An example embodiment of the present disclosure includes a method of electrically contacting a stator of an electric motor to a printed circuit board, the stator including a stator core and coils wound on the stator core, and the windings being defined by a winding wire including winding wire end sections and the winding wire end sections extend parallel or substantially parallel to the longitudinal axis of the electric motor. The method includes the steps of bending the winding wire end sections outward in the radial direction to the longitudinal axis, stripping the ends of the winding wire end sections, placing the stator with respect to the printed circuit board, with the printed circuit board and the stator including their upper and lower sides oriented parallel or substantially parallel to each other, inserting the ends of the winding wire end sections parallel or substantially parallel to the surface of the printed circuit board into splice elements arranged on the printed circuit board, compressing the splice elements to electrically contact the winding wire end sections with the printed circuit board.

DETAILED DESCRIPTION

Figure 1:
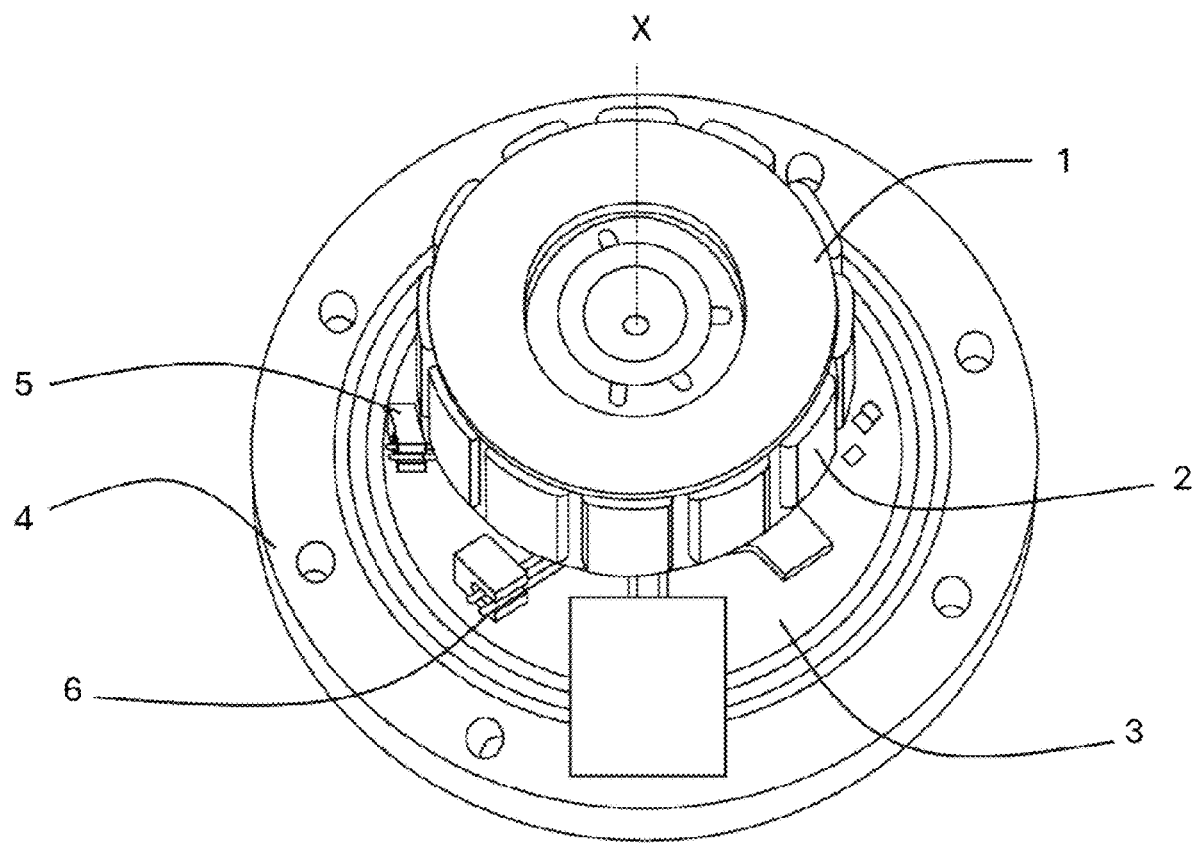
FIG. 1 shows a perspective view of an electrical connection between a printed circuit board and a stator of an electric motor according to an example embodiment of the present disclosure.

Example embodiments of the present disclosure are explained below and shown in FIGS. 1-4. A water pump includes an electric motor with a stator 1. A rotor 10 (shown, for example, in FIG. 4) surrounds the stator 1 concentrically to an axis of rotation X. The rotor 10 is connected to a motor shaft Z, which is not shown, to transmit a torque. The pump is designed as a dry rotor. The electric motor is a brushless DC motor. The stator 1 includes a stator core 2 which extends coaxially with the axis of rotation and includes a plurality of stator core segments, not shown, around each of which coils 9 are wound. The windings are three-phase wound, wherein the windings are defined by a winding wire including winding wire end sections 6, and the winding wire end sections 6 are electrically face-contacted with a printed circuit board 3. The stator 1 is fixedly mounted within a motor housing, not shown, which is covered with a cover 4 and is adapted to generate a time-varying magnetic field by the coils 9. The magnetized rotor 10 surrounds the stator 1 circumferentially. It is adapted to be rotated by an interaction with the time-varying magnetic field generated by the coils. A pump housing includes a housing member having a base plate and a dome projecting centrally from the base plate. The base plate and dome have a central opening extending through them. The stator 1 is firmly seated on the outside of the dome. The motor shaft 7, passes through the central opening of the housing member and is rotatably mounted within the dome. Seals, in particular mechanical seals, inside the dome guarantee that the fluid to be pumped does not penetrate the electric motor. The motor housing sits indirectly or directly on the pump housing.

Figure 2:
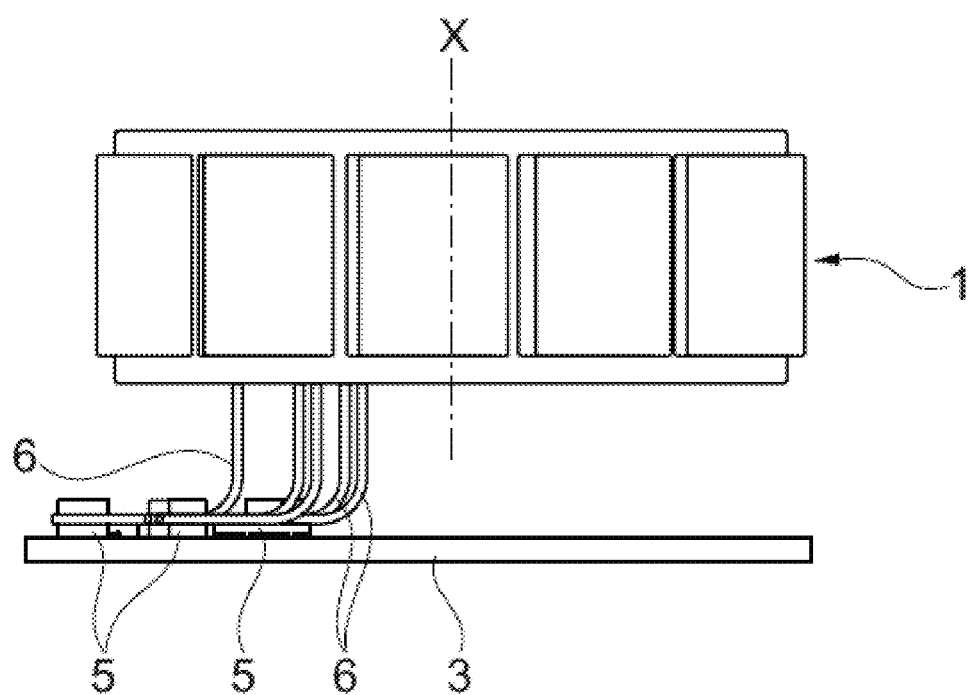
FIG. 2 shows a side view of an electrical connection between a printed circuit board and a stator of the electric motor according to an example embodiment of the present disclosure.
Figure 3:
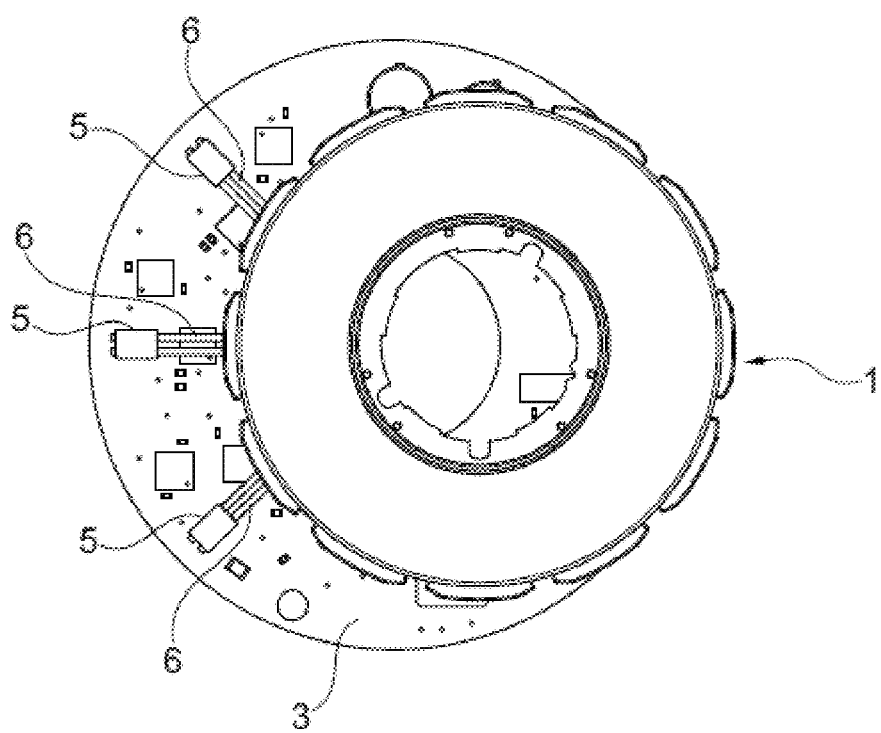
FIG. 3 shows a top view of an electrical connection between a printed circuit board and a stator of the electric motor according to an example embodiment of the present disclosure.
Figure 4:
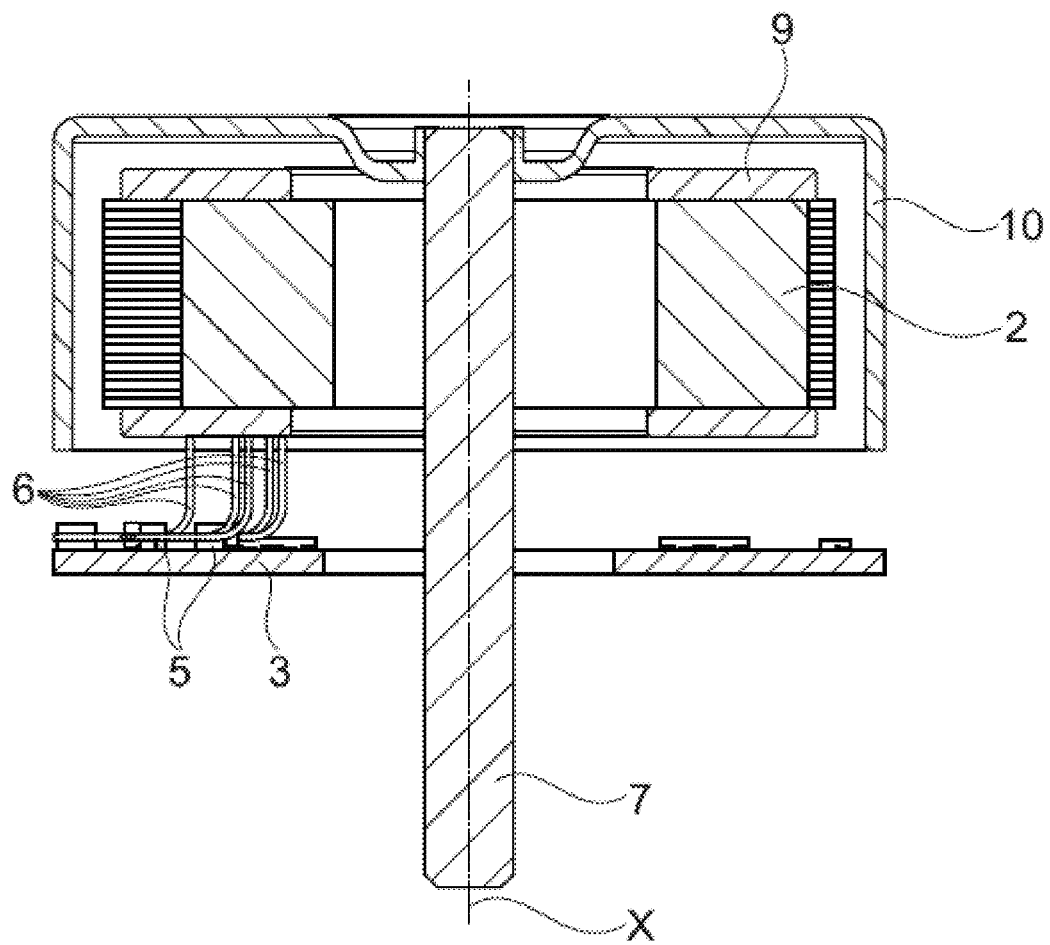
FIG. 4 shows a cutaway view of an assembled electric motor according to an example embodiment of the present disclosure.

As shown in FIG. 2, the winding wire end sections 6 extend radially outward from the stator 1. They are approximately the same length for all three phases. The winding wire end sections 6 first extend parallel or substantially parallel to the axis of rotation X and are then angled approximately perpendicular thereto, where they then align along the radius. Bending of the winding wire end sections 6 in the circumferential direction does not occur. The stator 1 and the printed circuit board 3 are arranged with their upper and lower surfaces parallel or substantially parallel to each other.

A splice element 5 is arranged, in particular soldered, on the printed circuit board 3 for each phase, as shown in FIG. 1. They make electrical contact with the printed circuit board 3. The splice elements S are made from a piece of cut strip material. The cut edges are serrated to obtain a more stable splice. The splice elements S are preferably made of a coated copper alloy.

The splice elements are preferably U-shaped in longitudinal section with two opposite legs, as shown in FIG. 1. The opening between the legs is perpendicular or approximately perpendicular to the longitudinal axis. The winding wire end sections of the respective phase are placed in the opening of the corresponding splice element, which wraps around the conductors and is squeezed to form a permanent connection. In the process, the legs of a splice element are moved toward each other and the opening is closed. The splice element fully surrounds the winding wire end sections and makes electrical contact. The winding wire end sections must be stripped for splicing. Since the winding wire end sections are moved in a plane parallel or substantially parallel to the surface of the printed circuit board, assembly is simplified. The stator is outside the splice elements when viewed from above the printed circuit board, i.e., it does not cover them. The contact area is therefore easily accessible for the splice tool. Crimping of all winding wire end sections of the three phases is performed in three successive steps. After a crimping operation has been completed, the splice tool is released and the stator assembly is rotated by a defined angle of rotation relative to the splice tool and the crimping operation is performed on the next splice element. This process can be well automated and improves process reliability.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A pump, comprising:
an electric motor with a rotor rotatably about an axis of rotation and circumferentially surrounding a stator; wherein
the stator includes a stator core and coils wound on the stator core, the coils being defined by a winding wire with winding wire end sections which are electrically contacted with a printed circuit board by a crimp connection;
splice elements are on the printed circuit board, and each of the splice elements includes an opening permitting insertion of two winding wire end sections of one phase, the opening extending parallel or substantially parallel to a surface of the printed circuit board;
the winding wire end sections extend radially outward beyond an outer circumference of the stator core such that ends of the winding wire end sections do not overlap the stator core in a direction parallel to the axis of rotation; and
the openings of the splice elements are directed in a circumferential direction which is parallel or substantially in parallel to the surface of the circuit board.

2. The pump according to claim 1, wherein the splice elements are U-shaped.

3. The pump according to claim 1, wherein the winding wire end sections are provided in respective ones of the splice elements parallel or substantially parallel to the surface of the printed circuit board.

4. The pump according to claim 1, wherein the stator and the printed circuit board are aligned with upper and lower sides parallel or substantially parallel to each other.

5. The pump according to claim 1, wherein the winding wire end sections extend exclusively in a radial direction and in a direction parallel or substantially parallel to the axis of rotation.

6. A method of electrically contacting a stator of an electric motor of a pump with a printed circuit board, wherein the stator includes a stator core and coils wound on the stator core, and the coils are formed of a winding wire including winding wire end sections and the winding wire end sections extend parallel or substantially parallel to a longitudinal axis of the pump, the method comprising:
  bending the winding wire end sections outward in a radial direction to the longitudinal axis;
  stripping ends of the winding wire end sections;
  placing the stator with respect to the printed circuit board, with the printed circuit board and the stator including upper and lower sides oriented parallel or substantially parallel to each other;
  inserting the ends of the winding wire end sections parallel or substantially parallel to a surface of the printed circuit board into splice elements on the printed circuit board; and
  compressing the splice elements to electrically contact the winding wire end sections with the printed circuit board; wherein
  the winding wire end sections extend radially outward beyond an outer circumference of the stator core such that ends of the winding wire end sections do not overlap the stator core in a direction parallel to the longitudinal axis; and
  openings of the splice elements are directed in a circumferential direction which is parallel or substantially in parallel to the surface of the circuit board.

7. An electric motor, comprising:
  a rotor mounted rotatably about an axis of rotation and surrounding a stator on a circumferential side, the stator including a stator core and coils wound on the stator core, and the coils being defined by a winding wire including winding wire end sections which are electrically contacted with a printed circuit board by a crimp connection; wherein
  splice elements are on the printed circuit board and each include an opening permitting insertion of two winding wire end sections of one phase, the opening extending parallel or substantially parallel to a surface of the printed circuit board;
  the winding wire end sections extend radially outward beyond an outer circumference of the stator core such that ends of the winding wire end sections do not overlap the stator core in a direction parallel to the axis of rotation; and
  openings of the splice elements are directed in a circumferential direction which is parallel or substantially in parallel to the surface of the circuit board.

8. The electric motor according to claim 7, wherein the splice elements are U-shaped.

9. The electric motor according to claim 7, wherein the winding wire end sections are provided in respective ones of the splice elements parallel or substantially parallel to the surface of the printed circuit board.

10. The electric motor according to claim 7, wherein the stator and the circuit board are aligned with upper and lower surfaces parallel or substantially parallel to each other.

11. The electric motor according to claim 7, wherein the winding wire end sections extend exclusively in a radial direction and in a direction parallel or substantially parallel to the axis of rotation.

12. A method of electrically contacting a stator of an electric motor to a printed circuit board, the stator including a stator core and coils wound on the stator core, the coils being formed from a winding wire including winding wire end sections, and the winding wire end sections extending parallel or substantially parallel to the longitudinal axis of the electric motor, the method comprising:
  bending the winding wire end sections outward in a radial direction to the longitudinal axis;
  stripping ends of the winding wire end sections;
  placing the stator with respect to the printed circuit board, with the printed circuit board and the stator including upper and lower sides oriented parallel or substantially parallel to each other;
  inserting the ends of the winding wire end sections parallel or substantially parallel to a surface of the printed circuit board into splice elements on the printed circuit board; and
  compressing the splice elements to electrically contact the winding wire end sections with the printed circuit board; wherein
  the winding wire end sections extend radially outward beyond an outer circumference of the stator core such that ends of the winding wire end sections do not overlap the stator core in a direction parallel to the longitudinal axis; and
  openings of the splice elements are directed in a circumferential direction which is parallel or substantially in parallel to the surface of the circuit board.

* * * * *